United States Patent
Takahashi et al.

(10) Patent No.: US 12,481,097 B2
(45) Date of Patent: Nov. 25, 2025

(54) MULTICORE FIBER, MANUFACTURING METHOD FOR MULTICORE FIBER, MULTICORE FIBER PREFORM, AND MANUFACTURING METHOD FOR MULTICORE FIBER PREFORM

(71) Applicant: FURUKAWA ELECTRIC CO., LTD., Tokyo (JP)

(72) Inventors: Masanori Takahashi, Tokyo (JP); Koichi Maeda, Tokyo (JP); Ryuichi Sugizaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 272 days.

(21) Appl. No.: 18/461,054

(22) Filed: Sep. 5, 2023

(65) Prior Publication Data

US 2023/0408759 A1 Dec. 21, 2023

Related U.S. Application Data

(63) Continuation of application No. PCT/JP2022/008012, filed on Feb. 25, 2022.

(30) Foreign Application Priority Data

Mar. 11, 2021 (JP) ................................. 2021-039215

(51) Int. Cl.
G02B 6/02 (2006.01)
G02B 6/036 (2006.01)

(52) U.S. Cl.
CPC ..... *G02B 6/02042* (2013.01); *G02B 6/03694* (2013.01)

(58) Field of Classification Search
CPC ........................ G02B 6/02042; G02B 6/03694
USPC .......................................... 385/123, 126–128
See application file for complete search history.

(56) References Cited

U.S. PATENT DOCUMENTS

| 9,031,371 B2 * | 5/2015 | Yonezawa ............ G02B 6/0281 |
| | | 385/127 |
| 2007/0201793 A1 | 8/2007 | Askins et al. |
| 2011/0222828 A1* | 9/2011 | Sasaoka ............. G02B 6/02042 |
| | | 385/127 |
| 2013/0148934 A1 | 6/2013 | Nakanishi et al. |
| 2013/0243379 A1* | 9/2013 | Yonezawa ................ G02B 6/02 |
| | | 385/123 |

(Continued)

FOREIGN PATENT DOCUMENTS

| JP | 2005-343703 A | 12/2005 |
| JP | 2011-209702 A | 10/2011 |

(Continued)

OTHER PUBLICATIONS

International Search Report issued Mar. 29, 2022 in PCT/JP2022/008012 filed on Feb. 25, 2022 3 pages.

*Primary Examiner* — Robert Tavlykaev
(74) *Attorney, Agent, or Firm* — Oblon, McClelland, Maier & Neustadt, L.L.P.

(57) ABSTRACT

A multicore fiber includes: a plurality of core portions made of glass; and a cladding portion made of glass and configured to surround outer periphery of the plurality of core portions. The cladding portion has tensile stress of 20 MPa or lower in a region on outer periphery side than a core portion that is closest to outer periphery of the cladding portion in the plurality of core portions.

10 Claims, 7 Drawing Sheets

(56) References Cited

U.S. PATENT DOCUMENTS

| | | | |
|---|---|---|---|
| 2015/0160408 A1 | 6/2015 | Bickham et al. | |
| 2016/0075590 A1 | 3/2016 | Gonda et al. | |
| 2016/0109651 A1* | 4/2016 | Borel | C03B 37/01869 |
| | | | 65/435 |
| 2017/0219770 A1* | 8/2017 | Bookbinder | C03C 13/046 |
| 2017/0261685 A1 | 9/2017 | Nakanishi et al. | |
| 2020/0400879 A1* | 12/2020 | Kawaguchi | C03B 37/027 |

FOREIGN PATENT DOCUMENTS

| | | |
|---|---|---|
| JP | 2013-122502 A | 6/2013 |
| JP | 2017-161705 A | 9/2017 |
| JP | 2017-171555 A | 9/2017 |
| JP | 2020-125227 A | 8/2020 |
| WO | WO 2014/178293 A1 | 11/2014 |

\* cited by examiner

LONGITUDINAL DIRECTION

MULTICORE FIBER, MANUFACTURING METHOD FOR MULTICORE FIBER, MULTICORE FIBER PREFORM, AND MANUFACTURING METHOD FOR MULTICORE FIBER PREFORM

This application is a continuation of International Application No. PCT/JP2022/008012, filed on Feb. 25, 2022 which claims the benefit of priority of the prior Japanese Patent Application No. 2021-039215, filed on Mar. 11, 2021, the entire contents of which are incorporated herein by reference.

BACKGROUND

The present disclosure relates to a multicore fiber, a manufacturing method for the multicore fiber, a multicore fiber preform, and a manufacturing method for the multicore fiber preform.

As a method for manufacturing a multicore fiber that is an optical fiber including a plurality of core portions; a hole drilling method is known (Japanese Patent Application Laid-open No. 2011-209702). In the hole drilling method, firstly, a cladding preform is formed by drilling a plurality of holes using a drill on a cylindrical glass rod that is a part of the cladding portion. Then, in each hole, a core preform including a core portion is inserted, so that a multicore fiber preform is formed. Subsequently, a multicore fiber is drawn from the multicore fiber preform. In this way, a multicore fiber may be manufactured.

SUMMARY

A multicore fiber faces a practical problem that sometimes the rupture strength is lower as compared to, for example, a single-mode optical fiber having a single core as defined in ITU-T G.652 (ITU stands for International Telecommunications Union). Particularly, a multicore fiber manufactured using a hole drilling method has a relatively lower ruptured strength at times.

There is a need for a multicore fiber having high rupture strength, a manufacturing method for the multicore fiber, a multicore fiber preform, and a manufacturing method for the multicore fiber preform.

According to one aspect of the present disclosure, there is provided a multicore fiber including: a plurality of core portions made of glass; and a cladding portion made of glass and configured to surround outer periphery of the plurality of core portions, wherein the cladding portion has tensile stress of 20 MPa or lower in a region on outer periphery side than a core portion that is closest to outer periphery of the cladding portion in the plurality of core portions.

According to another aspect of the present disclosure, there is provided a multicore fiber preform including: a plurality of core portions made of glass; and a cladding portion made of glass and configured to surround outer periphery of the plurality of core portions, wherein the cladding portion has a low softening point region on outer periphery side of a core portion that is closest to outer periphery of the cladding portion in the plurality of core portions, and the low softening point region has a lower softening point as compared to softening point in a region on center side than the low softening point region.

According to further aspect of the present disclosure, there is provided a manufacturing method for a multicore fiber preform including: housing each of a plurality of core preforms, which includes a core portion and a first cladding portion surrounding the core portion, into a groove formed on a columnar second cladding portion, which has a plurality of grooves formed on faces along longitudinal direction; and inserting the second cladding portion along with the plurality of core preforms into a cylindrical third cladding portion, wherein softening point of the third cladding portion is lower than softening points of the core preforms and the second cladding portion.

DETAILED DESCRIPTION

Figure 1:
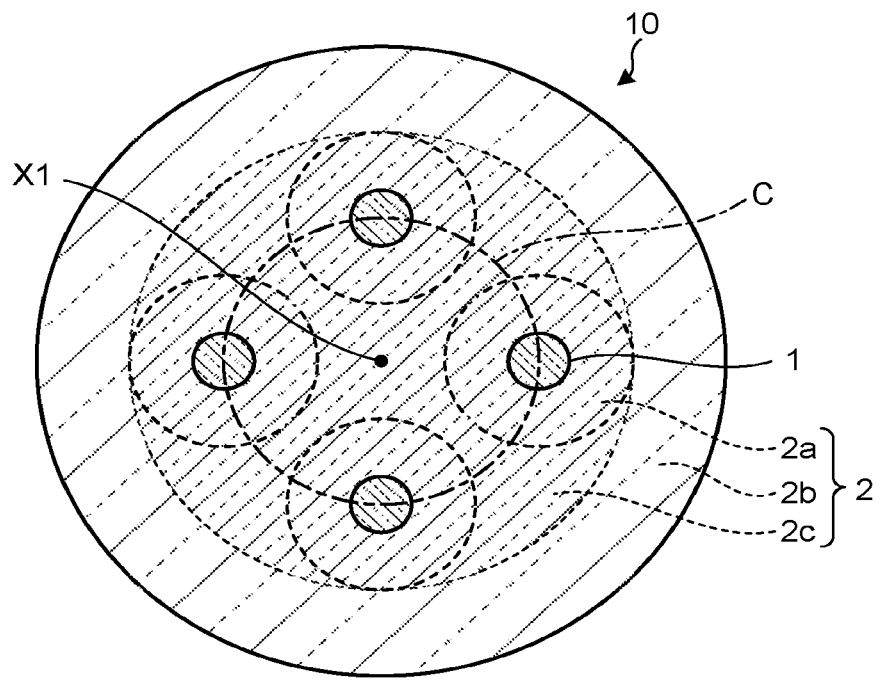
FIG. 1 is a schematic cross-sectional view of a multicore fiber according to a first embodiment.

Exemplary embodiments are described below in detail with reference to the accompanying drawings. However, the present disclosure is not limited by the embodiments described below. In the drawings, identical or corresponding constituent elements are referred to by the same reference numerals. Regarding the terms that are not specifically defined in the present written description, it is assumed that the definitions and the measurement methods given in ITU-T G.650.1 and ITU-T G.650.2 are followed.

FIG. 1 is a schematic cross-sectional view of a multicore fiber according to a first embodiment, and is a cross-sectional view taken at the face perpendicular to the longitudinal direction. A multicore fiber 10 includes four core portions 1 as a plurality of core portions; and includes a cladding portion 2 that surrounds the outer peripheries of the core portions 1. The core portions 1 and the cladding portion 2 are made of silica based glass.

The four core portions 1 are placed on a circle C that is centered around a central axis X1 of the multicore fiber 10. The cladding portion 2 has a lower refractive index than the maximum refractive index of the core portions 1.

The cladding portion 2 includes four first-type regions 2a, a second-type region 2b, and a third-type region 2c. Each first-type region 2a surrounds the outer periphery of one of the core portions 1 and has a toric cross-sectional surface. The second-type region 2b is formed on the outer periphery side of all core portions 1 and has a toric cross-sectional surface. The outer edge of the second-type region 2b coincides with the outer edge of the cladding portion 2. The first-type regions 2a are inscribed in the second-type region 2b. The third-type region 2c represents the region other than the first-type regions 2a and the second-type region 2b.

Each core portion 1 is made of silica based glass that includes a dopant such as germanium meant for increasing the refractive index. In the cladding portion 2; the first-type regions 2a and the third-type region 2c are made of, for example, pure silica glass that is a very highly pure form of silica glass which practically does not include any dopant for varying the refractive index and which has the refractive index of 1.444 at the wavelength of 1550 nm.

The second-type region 2b includes at least a single element from among, for example, halogen, alkali metal, or boron. Herein, halogen represents fluorine, chlorine, or bromine; while alkali metal represents lithium, natrium, or potassium.

In the cladding portion 2, in the region present on the outer periphery side than the closest core portion 1 to the outer periphery of the cladding portion 2, the tensile stress is equal to or lower than 20 MPa. In the multicore fiber 10, since all four core portions 1 are equidistant from the outer periphery of the cladding portion 2, the closest core portion 1 to the outer periphery of the cladding portion 2 implies each one of the core portions 1. Thus, the second-type region 2b, some part of the first-type regions 2a, and some part of the third-type region 2c represent the regions having the tensile stress equal to or lower than 20 MPa.

The inventors did a thorough study and found out that, when the cladding portion 2 includes regions having the stress equal to or lower than 20 MPa, there is a relative increase in the rupture strength of the multicore fiber 10.

Figure 2:
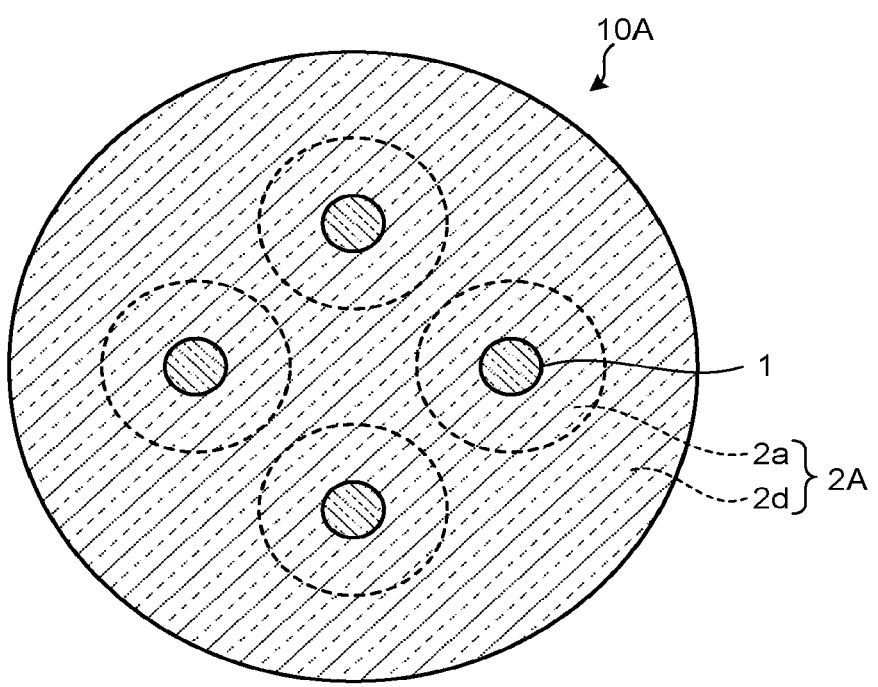
FIG. 2 is a schematic cross-sectional view of a multicore fiber according to a comparative example.

For example, FIG. 2 is a schematic cross-sectional view of a multicore fiber according to a comparative example. In a multicore fiber 10A, a cladding portion 2A does not include the second-type region 2b and includes a third-type region 2d that extends up to the outer edge of the cladding portion 2A. Other than that, the multicore fiber 10A has an identical configuration to the multicore fiber 10 according to the first embodiment.

Figure 3:
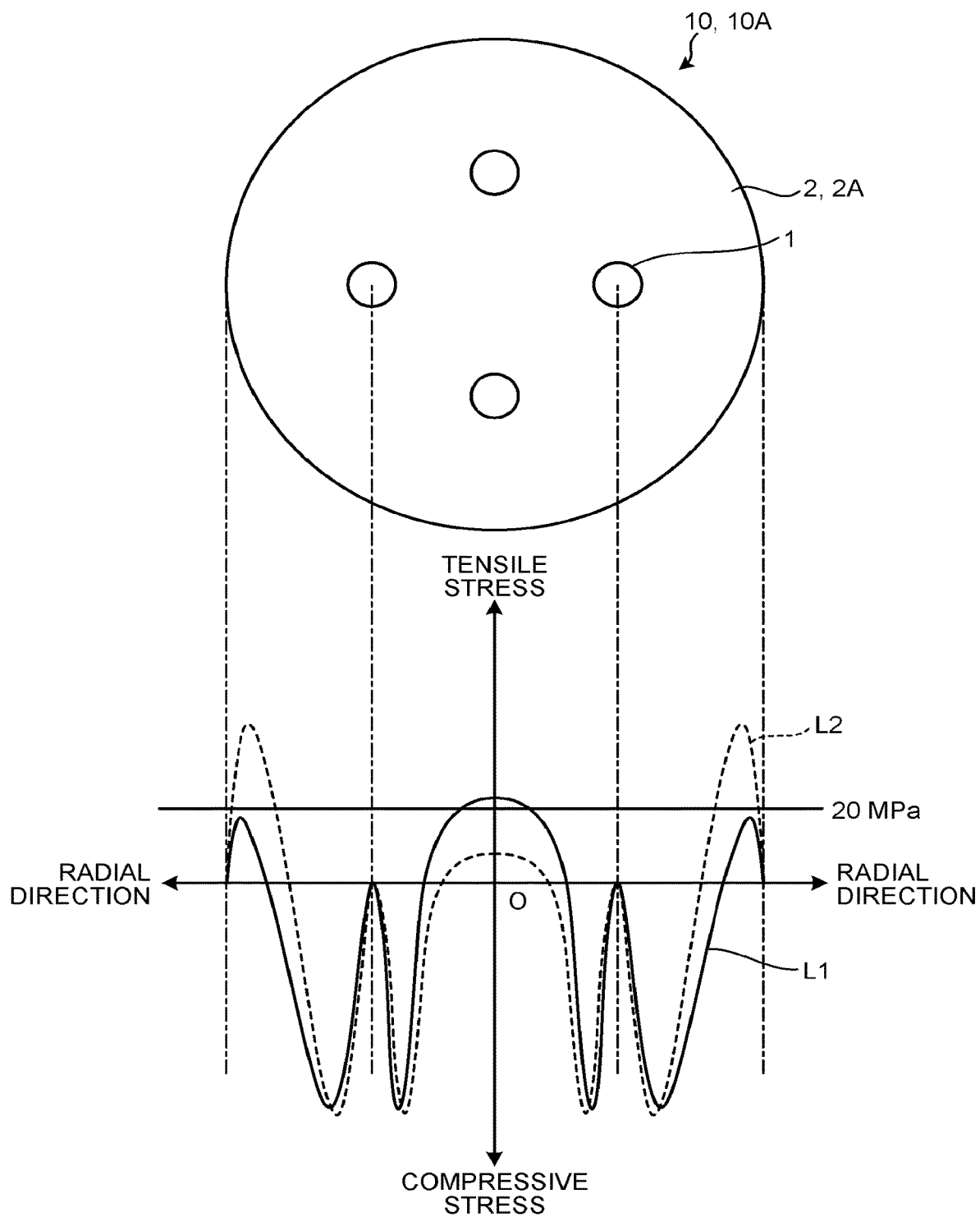
FIG. 3 is a diagram illustrating the stress distribution of multicore fibers in radial directions.

FIG. 3 is a diagram illustrating the stress distribution of the multicore fibers 10 and 10A in radial directions. Herein, a curved line L1 indicates the stress distribution of the multicore fiber 10, and a curved line L2 indicates the stress distribution of the multicore fiber 10A. Moreover, in FIG. 3, the tensile stress is indicated as a positive value, and the compressive stress is indicated as a negative value.

As illustrated in FIG. 3, in the cladding portion 2A of the multicore fiber 10A, a region having the tensile stress higher than 20 MPa is present on the outer periphery side than the core portions 1. On the other hand, in the cladding portion 2 of the multicore fiber 10, a region having the tensile stress higher than 20 MPa is not present on the outer periphery side than the core portions 1, and the tensile stress remains equal to or lower than 20 MPa.

In the cladding portion 2A of the multicore fiber 10A, since the tensile stress is higher than 20 MPa on the outer periphery side than the core portions 1, cracks may easily develop from the outer edge of the cladding portion 2A, thereby resulting in a decline in the rupture strength. In contrast, in the cladding portion 2 of the multicore fiber since the tensile stress remains equal to or lower than MPa on the outer periphery side than the core portions 1, cracks are difficult to develop from the outer edge of the cladding portion 2, and the rupture strength increases.

Meanwhile, as compared to the multicore fiber 10A, in the multicore fiber 10, there is a relatively higher compressive stress at the positions of the core portions 1. Moreover, at the position of the central part of the cladding portion 2 in the multicore fiber 10, the tensile stress is higher as compared to the tensile stress at the position of the central part of the cladding portion 2A in the multicore fiber 10A. The region at the central part of the cladding portion 2 represents an example of a region which is present on the center side than the core portions 1 and which has a greater maximum tensile stress as compared to the maximum tensile stress in the region present on the outer periphery side than the core portions 1.

Figure 4:
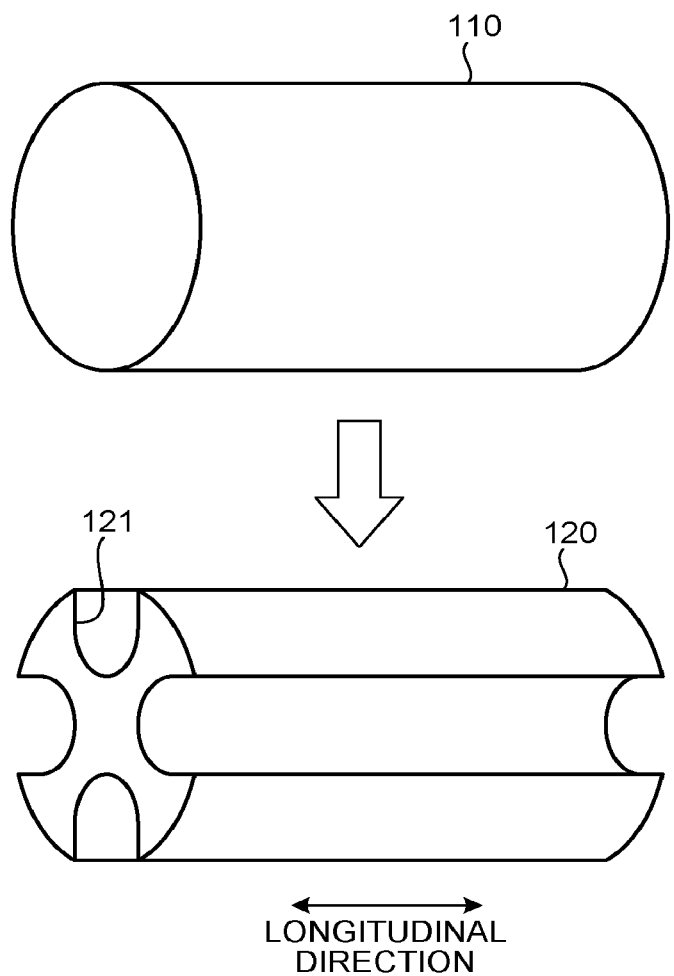
FIG. 4 is a diagram for explaining a manufacturing method for the multicore fiber.
Figure 5:
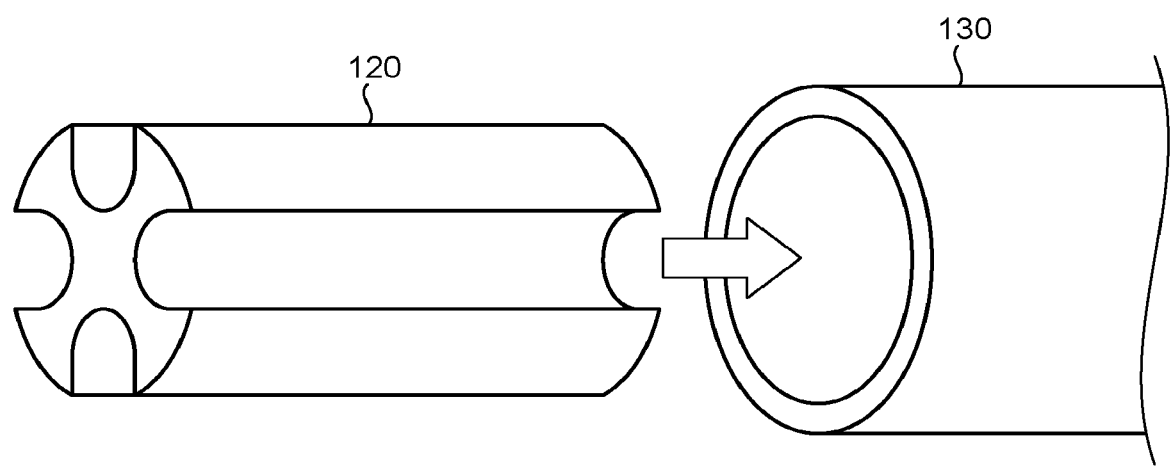
FIG. 5 is a diagram for explaining a manufacturing method for the multicore fiber.
Figure 6:
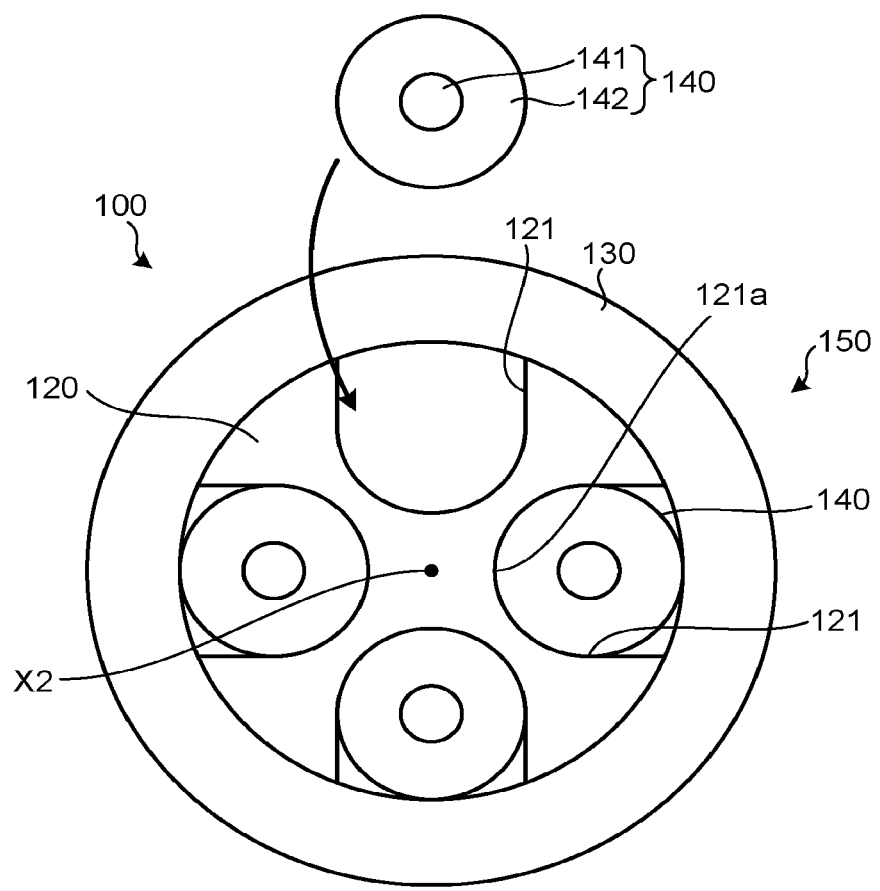
FIG. 6 is a diagram for explaining a manufacturing method for the multicore fiber.

Explained below with reference to FIGS. 4 to 6 is an exemplary manufacturing method for the multicore fiber 10.

Firstly, as illustrated in FIG. 4, a cylindrical glass rod 110 is prepared. The glass rod 110 represents the third-type region 2c of the cladding portion 2 of the multicore fiber 10, and is made of the same glass material as the third-type region 2c. Then, on the lateral faces of the glass rod 110, four grooves 121 are machined along the longitudinal direction, and a columnar third cladding portion 120 is manufactured. In each groove 121, the width remains substantially same from the lateral face to halfway in the depth direction of the third cladding portion 120, and then a round bottom face is formed on the center side of the third cladding portion 120.

Meanwhile, the third cladding portion 120 is not limited to be prepared by processing the cylindrical glass rod 110, and may alternatively be prepared by means of molding.

Subsequently, as illustrated in FIG. 5, the third cladding portion 120 is inserted into the hollow portion of a cylindrical second cladding portion 130. Herein, the second cladding portion 130 represents the second-type region 2b of the cladding portion 2 of the multicore fiber and is made of the same glass material as the second-type region 2b.

Then, as illustrated in FIG. 6, in each groove 121 of the third cladding portion 120, a core preform 140 is housed. Each core preform 140 is configured with a core portion 141, and a cylindrical first cladding portion 142 that surrounds the outer periphery of the core portion 141. The core portion 141 represents the core portion 1 of the multicore fiber 10, and is made of the same glass material as the core portion 1. The first cladding portion 142 represents the first-type region 2a of the cladding portion 2 of the multicore fiber 10, and is made of the same glass material as the first-type region 2a. As a result, a multicore fiber preform 100 is manufactured.

Meanwhile, the four core portions 1 are placed to be equidistant from a central axis X2 representing the central axis of the third cladding portion 120 and the central axis of the second cladding portion 130. The grooves 121 of the third cladding portion 120 have a shape meant for positioning the core preforms 140 in such a way that all four core portions 1 are equidistant from the central axis X2.

Then, the multicore fiber 10 may be manufactured by heat-melting the multicore fiber preform 100 and drawing a multicore fiber. Herein, before drawing a multicore fiber, the multicore fiber preform 100 may be heated so as to integrate the core preforms 140, the third cladding portion 120, and the second cladding portion 130.

Regarding the multicore fiber preform 100, more specific explanation is given below with reference to FIG. 6. The multicore fiber preform 100 includes four core portions 141, and a cladding portion 150 that surrounds the outer peripheries of the four core portions 141. The cladding portion 150 includes the first cladding portion 142, the second cladding portion 130, and the third cladding portion 120.

The second cladding portion 130 constitutes a low softening point region in the cladding portion 150 and on the outer periphery side than the core portions 141. In the low softening point region, the softening point is lower than the softening point in the region present on the center side than the low softening point region. More particularly, the softening point of the second cladding portion 130 is lower than the softening points of the core portions 141, the first cladding portion 142, and the third cladding portion 120 representing the regions that are present on the center side (on the side of the central axis X2) than the second cladding portion 130. Such a relationship among the softening points may be achieved in the following manner. The first cladding portion 142 and the third cladding portion 120 are made of pure silica glass; and the additive amount of at least a single element from among halogen, alkali metal, and boron in the second cladding portion 130 made of silica based glass is adjusted in such a way that the softening point of the second cladding portion 130 becomes lower than the softening point of the core portions 141.

Thus, the softening point of the second cladding portion 130 is lower than the softening points of the core portions 141, the first cladding portion 142, and the third cladding portion 120. Hence, at the time of heat-melting the multicore fiber preform 100 and drawing a fiber, the fluidity of the third cladding portion 120 becomes lower than the fluidity on the inner side. As a result, it is believed that, in the multicore fiber 10 that has been drawn, a region having the tensile stress equal to or lower than 20 MPa is formed on the outside periphery side.

When a multicore fiber preform is manufactured using the drilling method, it becomes necessary to have an insertion clearance in between the core preforms and the holes on the cladding preform. For that reason, the holes are formed to have a greater internal diameter than the external diameter of the core preforms. As a result of having such a clearance, at the time of drawing a fiber during heat-melting, sometimes the core preforms move inside the holes toward the center. Accordingly, the relative positional relationship among the four core portions sometimes deviates from the design.

In contrast, each groove 121 of the third cladding portion 120 has such a shape that a bottom face 121a of each groove 121 is inscribed in substantially half of the region of the outer periphery of the corresponding core preform 140. That is, the bottom face 121a of each groove 121 has a round bottom shape running along the shape of the outer periphery of the corresponding core preform 140. As a result, each core preform 140 is supported by the third cladding portion 120 and is restricted from orienting toward the center in a radial direction and from moving in a circumferential direction. Thus, at the time of drawing a fiber during heat-melting, even if a force is acting for moving the core preforms 140 toward the center, a variation in the relative positions is restricted. As a result, the relative positional relationship among the four core portions 141 is maintained, and relative positional relationship among the four core portions 1 in the multicore fiber 10 may be maintained with high accuracy as per the design.

Meanwhile, a stacking method represents one of the other methods other than the drilling method for manufacturing a multicore fiber preform. In the stacking method, a core preform is positioned by way of restraint applied using other core preforms and the glass rod. Hence, the core preforms are easy to get misaligned and the accuracy of the positional relationship among the core portions tends to go down. Moreover, in the stacking method, since the core portions need to be placed at lattice points, there are restrictions also on the design of the core portions. Hence, the manufacturing method explained in the first embodiment has an advantage over the drilling method or the stacking method in terms of the degree of freedom and the positional accuracy of the placement of the core portions.

Moreover, in the multicore fiber preform 100, the grooves 121 on the third cladding portion 120 are formed by machining the lateral faces of the glass rod 110. Hence, unlike in the drilling method, the length of the cladding preforms is not restricted by the length of the drill. As a result, the multicore fiber preform 100 may be easily increased in size, and there is an advantage from the perspective of reducing the cost of the multicore fiber 10.

The multicore fiber 10 having the configuration explained above according to the first embodiment has high rupture strength; and it is possible to achieve the rupture strength equivalent to, for example, a standard SMF. Moreover, the multicore fiber 10 has high positional accuracy and a high degree of freedom in regard to the placement of the core portions 1. Furthermore, the multicore fiber preform 100 that is configured in the manner explained above may be used in manufacturing the multicore fiber 10, and may be easily increased in size.

More particularly, according to the manufacturing method explained in the first embodiment, as compared to the drilling method, the multicore fiber preform may be easily increased in length as well as in outer diameter. For example, in the drilling method, the drillable length has the upper limit of about 1000 mm. However, in the manufacturing method explained in the first embodiment, since the third cladding portion 120 may be processed by outer cutting, there is less restriction on the length.

In the drilling method, when the outer diameter of the multicore fiber preform increases and the hole diameter increases, it results in an increase in the load on the drilling tool (such as a drill) and the difficulty level of the processing goes up. In contrast, in the manufacturing method according to the first embodiment, the third cladding portion 120 may be processed by outer cutting. Hence, even if there is an increase in the portion to be subjected to outer cutting, the difficulty level of the processing does not easily go up. Moreover, regarding the second cladding portion 130, large-size members in terms of the outer diameter and the length have already been put to practical use. Hence, there are less restrictions as far as increasing the size is concerned.

As a working example, the manufacturing method explained above was implemented and a multicore fiber having the configuration of the multicore fiber 10 according to the first embodiment was manufactured. In the manufactured multicore fiber according to the working example, all four core portions had the transmission loss equal to or smaller than 0.21 dB/km, and the inter-core crosstalk was equal to or smaller than −27 dB per 100 km.

Moreover, a multicore fiber having the configuration of the multicore fiber 10A according to the comparative example was also manufactured. Then, the stress distribution of the multicore fiber according to the working example and the stress distribution of the multicore fiber according to the comparative example was measured using a stress distribution measurement device (model number: IFA-100, manufacturer: Interfiber Analysis). In the multicore fiber according to the comparative example, a region having the tensile stress equal to or higher than 30 MPa was found to be present on the outer periphery side of the core portions. In contrast, in the multicore fiber according to the working example, no region on the outer periphery side of the core portions exceeded the tensile stress of 20 MPa, and the tensile stress remained equal to or lower than 20 MPa.

Regarding the positional accuracy of the core portions with reference to the designed value, a maximum misalignment of 0.3 μm was found in the multicore fiber according to the comparative example, and a maximum misalignment of 0.2 μm was found in the multicore fiber according to the working example.

Moreover, when a proof test was carried by applying the stress causing an extension of 1% of the multicore fiber, the average survival duration of the multicore fiber according to the working example was enhanced by 30% or more as compared to the average survival duration of the multicore fiber according to the comparison example.

Figure 7:
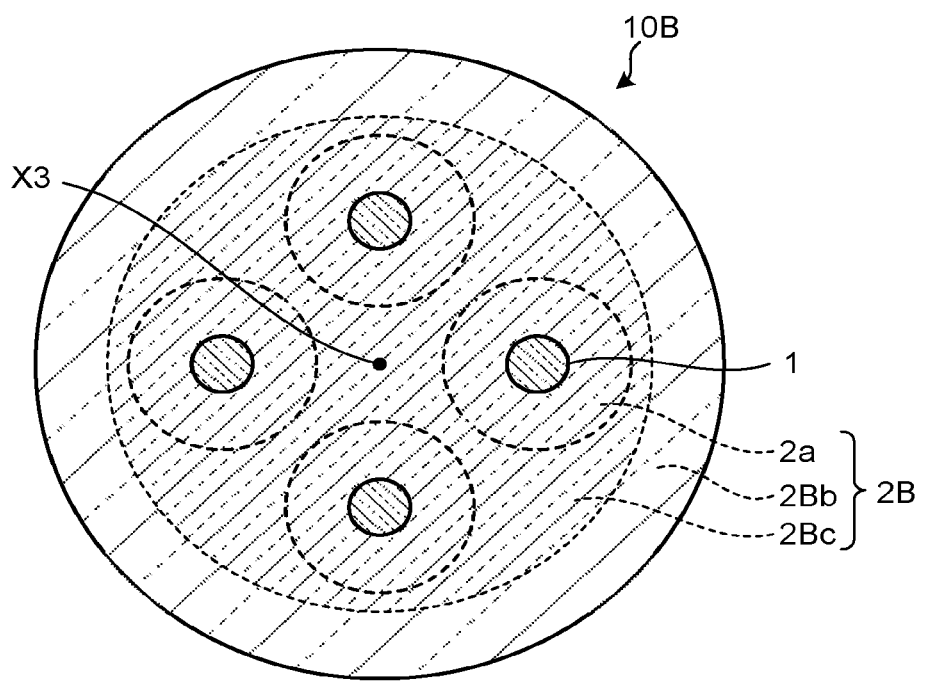
FIG. 7 is a schematic cross-sectional view of a multicore fiber according to a second embodiment.

FIG. 7 is a schematic cross-sectional view of a multicore fiber according to a second embodiment, and is a cross-sectional view taken at the face perpendicular to the longitudinal direction. A multicore fiber 10B includes the four core portions 1 as a plurality of core portions; and includes a cladding portion 2B that surrounds the outer peripheries of the core portions 1. The core portions 1 and the cladding portion 2B are made of silica based glass.

The four core portions 1 are placed on a circle that is centered around a central axis X3 of the multicore fiber 10B. The cladding portion 2B has a lower refractive index than the maximum refractive index of the core portions 1.

The cladding portion 2B includes a plurality of first-type regions 2a, a second-type region 2Bb, and a third-type region 2Bc. Each first-type region 2a surrounds the outer periphery of one of the core portions 1 and has a toric cross-sectional surface. The second-type region 2Bb is formed on the outer periphery side of all core portions 1 and has a toric cross-sectional surface. The outer edge of the second-type region 2Bb coincides with the outer edge of the cladding portion 2B. The first-type regions 2a are not inscribed in the second-type region 2Bb and are placed while maintaining a predetermined gap. The third-type region 2Bc represents the region other than the first-type regions 2a and the second-type region 2Bb.

Regarding the core portions 1, the first-type regions 2a, the second-type region 2Bb, and the third-type region 2Bc; the constituent material may be same as the constituent material of the core portions 1, the first-type regions 2a, the second-type region 2b, and the third-type region 2c, respectively, of the multicore fiber 10 according to the first embodiment.

In the multicore fiber 10B too, the tensile stress of the cladding portion 2B is equal to or lower than 20 MPa in the region present on the outer periphery side than the closest core portion 1 to the outer periphery of the cladding portion 2.

Figure 8:
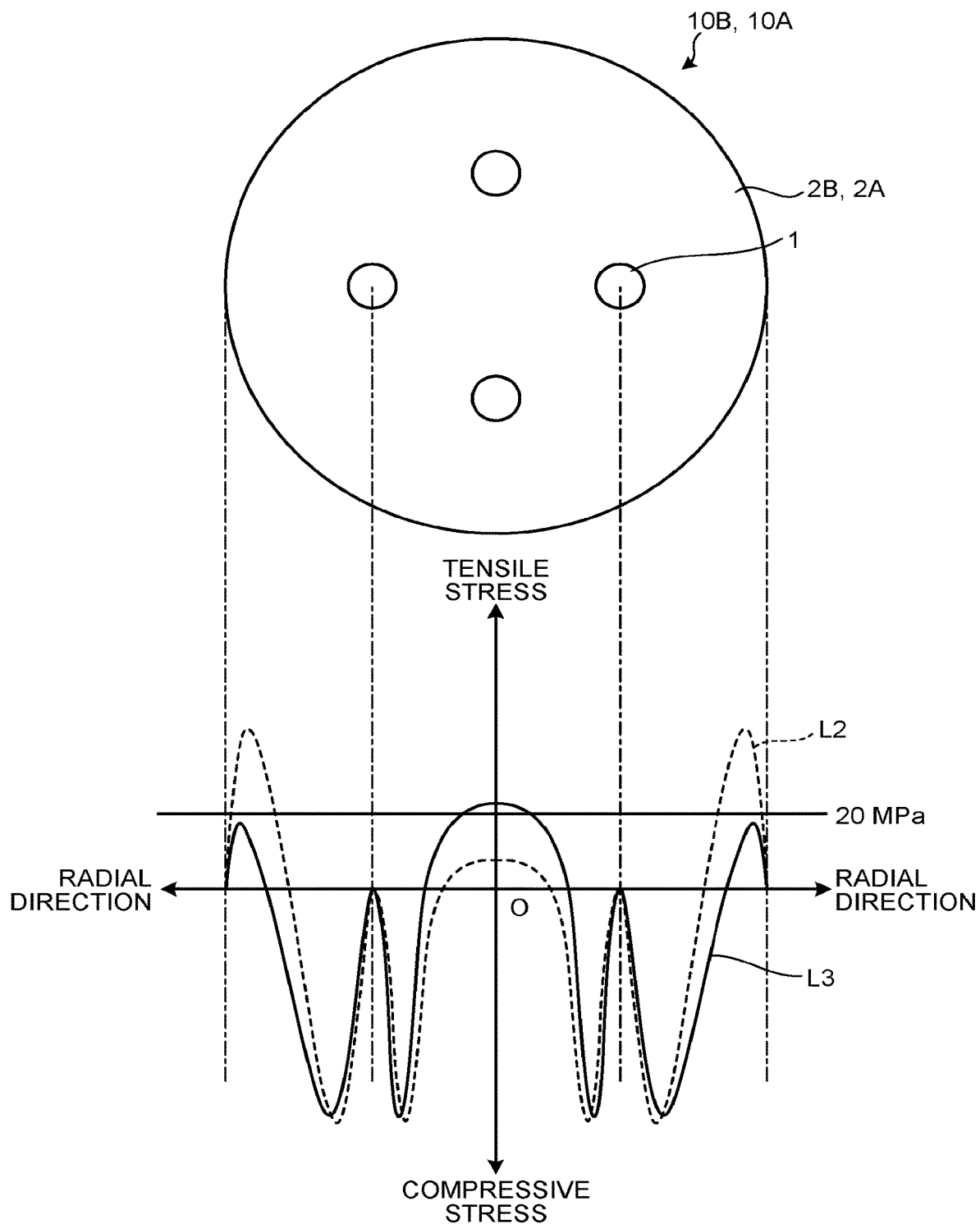
FIG. 8 is a diagram illustrating the stress distribution of multicore fibers in radial directions.

FIG. 8 is a diagram illustrating the stress distribution of the multicore fibers 10A and 10B in radial directions. Herein, a curved line L3 indicates the stress distribution of the multicore fiber 10B, and the curved line L2 indicates the stress distribution of the multicore fiber 10A according to the comparative example. Moreover, in FIG. 8, the tensile stress is indicated as a positive value, and the compressive stress is indicated as a negative value.

As illustrated in FIG. 8, in the cladding portion 2B of the multicore fiber 10B, there is no region having the tensile stress higher than 20 MPa on the outer periphery side than the core portions 1, and the tensile stress remains equal to or lower than 20 MPa.

In the cladding portion 2B of the multicore fiber 10B, since the tensile stress remains equal to or lower than 20 MPa on the outer periphery side than the core portions 1, cracks are difficult to develop from the outer edge of the cladding portion 2B, and the rupture strength increases.

Meanwhile, in the multicore fiber 10B, the stress at the positions of the core portions 1 is substantially equal to zero as is the case in the multicore fiber 10A. However, at the position of the central part of the cladding portion 2B in the multicore fiber 10B, the tensile stress is higher than the tensile stress at the position of the central part of the cladding portion 2A in the multicore fiber 10A. The region at the central part of the cladding portion 2B represents an example of a region which is present on the center side than the core portions 1 and which has a greater tensile stress as compared to the maximum tensile stress in the region present on the outer periphery side than the core portions 1.

In an identical manner to the multicore fiber 10, the multicore fiber 10B having the configuration explained above too has high rupture strength, and it is possible to achieve the rupture strength equivalent to, for example, a standard SMF.

Figure 9:
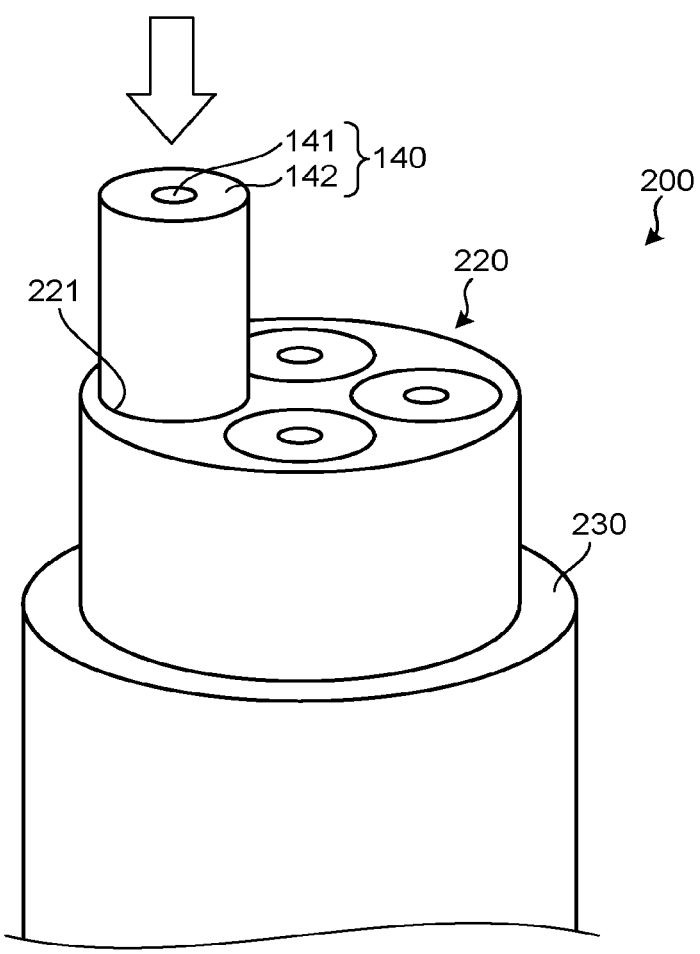
FIG. 9 is a diagram for explaining a manufacturing method for the multicore fiber.

In FIG. 9 is illustrated an exemplary manufacturing method of a multicore fiber preform 200 used in manufacturing the multicore fiber 10B. Firstly, a columnar third cladding portion 220 is prepared by forming holes 221 into a cylindrical glass rod.

However, the third cladding portion 220 is not limited to be prepared by processing a cylindrical glass rod, and may alternatively be prepared by means of molding.

Subsequently, the third cladding portion 220 is inserted into the hollow portion of a cylindrical second cladding portion 230. Then, the core preforms 140 are inserted into the holes 221 formed on the third cladding portion 220. Herein, the two insertion processes may be performed in an arbitrary sequence. In this way, the multicore fiber preform 200 is manufactured.

Then, the multicore fiber 10B may be manufactured by heat-melting the multicore fiber preform 200 and drawing a multicore fiber. Herein, before drawing a multicore fiber, the multicore fiber preform 200 may be heated so as to integrate the core preforms 140, the third cladding portion 220, and the second cladding portion 230.

Meanwhile, in the multicore fibers 10 and 10B according to the embodiments described above, although four core portions 1 are included, there is no particular restriction on the number of core portions. Moreover, for example, although the core portions 1 are placed on a circle that is centered around the central axis of the multicore fiber 10 or the multicore fiber 10B, there is no particular restriction on the placement of the core portions 1. For example, if there is a higher number of core portions such as eight or more, they may be arranged in a concentric manner around the central axis of the multicore fiber. In that case too, in the region present on the outer periphery side than the closest core portion to the outer periphery of the cladding portion, the tensile stress is equal to or lower than 20 MPa.

Meanwhile, for example, the core portions, the first-type regions, or the third-type region may include at least a single element from among, for example, halogen, alkali metal, or boron. In that case, the content of at least a single element from among, for example, halogen, alkali metal, or boron in the second-type region may be adjusted in such a way that, in the region present on the outer periphery side than the closest core portion to the outer periphery of the cladding portion, the tensile stress becomes equal to or lower than 20 MPa.

The present disclosure is suitable for implementing in an optical fiber that includes a plurality of core portions.

According to the present disclosure, it is possible to realize a multicore fiber having high rupture strength.

While certain embodiments have been described, these embodiments and modification examples have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A multicore fiber comprising:
a plurality of core portions made of glass; and
a cladding portion made of glass and configured to surround an outer periphery of the plurality of core portions,
wherein the cladding portion has tensile stress of 20 MPa or lower in a region on an outer periphery side opposing an inner portion that is closest to the outer periphery the plurality of core portions, and
a central region of the cladding portion is configured to have a maximum tensile stress greater than a maximum tensile stress in the region.

2. The multicore fiber according to claim 1, wherein the region includes at least one element of halogen, alkali metal, and boron.

3. The multicore fiber according to claim 1, wherein the plurality of core portions are placed in a concentric manner around central axis of the multicore fiber.

4. A multicore fiber preform comprising:
a plurality of core portions made of glass; and
a cladding portion made of glass and configured to surround an outer periphery of the plurality of core portions,
wherein the cladding portion has a low softening point region on an outer periphery side thereof, and
the low softening point region has a lower softening point compared to a softening point of a central region of the cladding portion so that the central region of the cladding portion is configured to have a maximum tensile stress greater than a maximum tensile stress in the low softening point region.

5. The multicore fiber preform according to claim 4, wherein the low softening point region includes at least one element of halogen, alkali metal, and boron.

6. The multicore fiber preform according to claim 4, wherein
the cladding portion includes a first cladding portion, a second cladding portion, and a third cladding portion,
the first cladding portion has a cylindrical shape surrounding outer peripheries of the core portions, and is configured to constitute core preforms along with the core portions,
the second cladding portion has a cylindrical shape and is configured to constitute the low softening point region, and
the third cladding portion has a columnar shape and has grooves formed on lateral faces along longitudinal direction for purpose of housing the core preforms.

7. The multicore fiber preform according to claim 6, wherein the third cladding portion is configured to support the core preforms and restrict movement of the core preforms.

8. The multicore fiber according to claim 6, wherein a groove formed on the third cladding portion has such a shape that bottom face of the groove is inscribed in substantially half of region of outer periphery of the core preform.

9. A manufacturing method for a multicore fiber, comprising drawing a multicore fiber by heat-melting the multicore fiber preform according to claim 4.

10. A manufacturing method for a multicore fiber preform, comprising:
housing each of a plurality of core preforms, which includes a core portion and a first cladding portion surrounding the core portion, into a groove formed on a columnar second cladding portion, which has a plurality of grooves formed on faces along longitudinal direction; and
inserting the second cladding portion along with the plurality of core preforms into a cylindrical third cladding portion, wherein softening point of the third cladding portion is lower than softening points of the core preforms and the second cladding portion so that a central region of the cladding portion is configured to have a maximum tensile stress greater than a maximum tensile stress in the third cladding portion.

* * * * *